CRYSTAL LIGHT VALVE FOR SOUND-ON-FILM RECORDING

Filed Aug. 28, 1951 2 Sheets-Sheet 1

Inventors,
Robert Dressler
Albert A. Chesnes
by their Attorneys
Darby & Darby

Inventors,
Robert Dressler
Albert A. Chesnes
by their Attorneys,
Darby + Darby

Patented Aug. 18, 1953 2,649,507

UNITED STATES PATENT OFFICE 2,649,507

CRYSTAL LIGHT VALVE FOR SOUND-ON-FILM RECORDING

Robert Dressler, Elmont, N. Y., and Albert A. Chesnes, Elmhurst, N. Y., assignors, by mesne assignments, to Paramount Pictures Corporation, New York, N. Y., a corporation of New York Application August 28, 1951, Serial No. 244,076

10 Claims. (Cl. 179—100.3)

The present invention relates to the recording of sound-on-film and particularly to the use of a light valve comprising an electro-optical crystal such for example as a crystal of dihydrogen phosphate.

More particularly still the invention relates to a light valve which may be directly substituted for the mechanical light valves currently in use and which may be very economically produced and which is extremely rugged.

The light valve and sound modulator of this invention is particularly useful in connection with the system of intermediate film theater television which has been in use a considerable period of time in the Paramount Theatre in New York city and in other locations.

In this system a television broadcast is received at the theatre and a movie camera located adjacent to the cathode ray tube of the television receiver photographs the face of that tube, the film being immediately developed and otherwise processed and passed through a projector so that the picture is projected on the movie screen a few seconds after its reception. It is of course also necessary that the received sound be synchronized with the picture and this is done by modulating a light valve in accordance with the sound reception to produce a sound track on the edge of the film.

As will be obvious from the above we have devised a sound-on-film recording device utilizing a crystal light valve which, despite the known electro-optical characteristics of such crystals, has not previously been considered practical.

It is an object of our invention to provide a device for recording sound-on-film which utilizes a piezoelectric crystal as a light valve.

It is another object of our invention to provide such a device which is low in cost and so rugged as to require substantially no maintenance.

It is another object of our invention to provide a crystal light valve for sound-on-film recording which is similar to existing equipment as regards the input thereto and the output therefrom and the quality of the output of which is not substantially less than that of the presently commonly used mechanical light modulator.

Other objects and features of the invention will be apparent when the following description is considered in connection with the annexed drawings, in which, Figure 1 is a longitudinal vertical cross sectional view of the light modulator of our invention;

Figure 1:
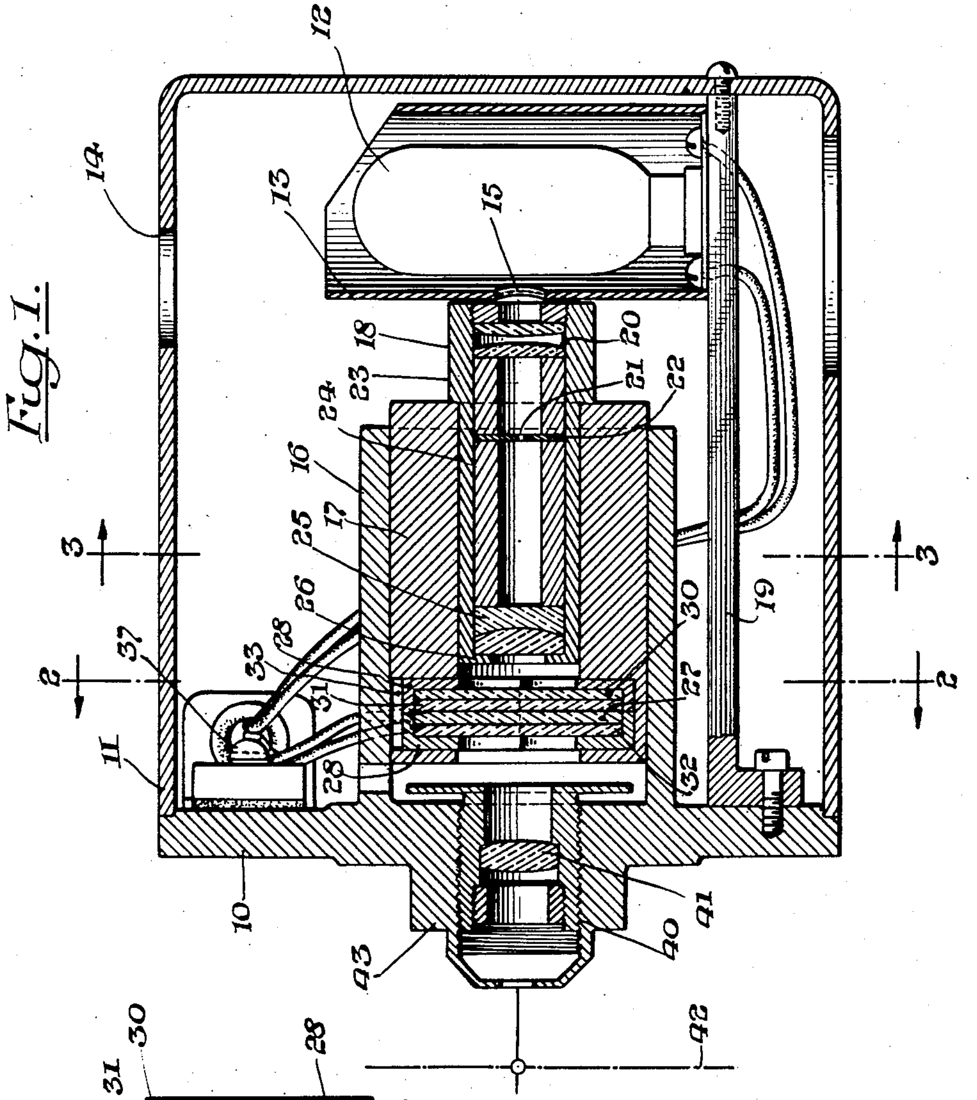

Referring now to the drawings there is shown in Figure 1 a supporting plate 10 on which the various parts of the light modulator of our invention are mounted. Fixed to the plate 10 in any suitable manner is a housing member 11 which serves merely to enclose the parts and does not function in any substantial respect as a mounting for those parts. At the right of the housing, as seen in Figure 1, is a lamp or light source 12 which is mounted in a chimney 13, there being an opening 14 in the housing 11 so that heat generated by the lamp may rise in the chimney and pass out through the opening 14.

The lamp 12 and chimney 13 are mounted upon a bracket 19 which bracket is supported by the plate 10 in any suitable manner such for example as by being screw-fastened thereto.

At the left of the chimney 13 is provided an opening in which there is placed a blue filter 15 through which light from the light source 12 enters the optical system shortly to be described. This optical system comprises two groups of elements which, for convenience, may be designated the crystal group and the slit group. These two groups of elements are supported in a fixed relationship with respect to each other, both being rigidly supported by the plate 10, there being, however, slight adjustment possible as between the two groups. Plate 10 is provided with an integral cylindrical extension 16. Within the extension 16 is a sleeve 17 which sleeve, as will later appear, supports the major portion of the elements heretofore designated as the crystal group.

Within the sleeve 17 is another cylindrical holder 18 which in turn supports the elements of the slit group.

Mounted within the sleeve 18 is a first optic 20 which serves to project light from the source 12 upon a slit 21 in a plate 22 which plate is positioned within the sleeve 18 by means of the two spacing-sleeves 23 and 24. It is to be noted that the lens or optic 20 is not focused exactly on the slit 21 in order that the lamp filament may not be discernable on the sound track on which the modulated light beam is to be effective.

Figure 4:
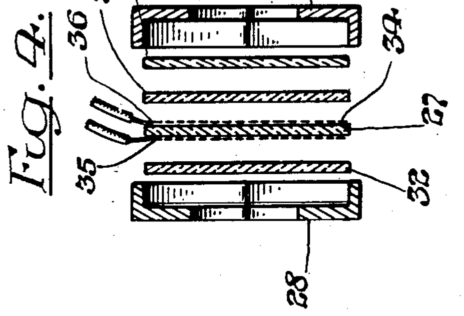
Figure 4 is an exploded view of the light valve showing in detail the relationship of its parts.
Figure 2:
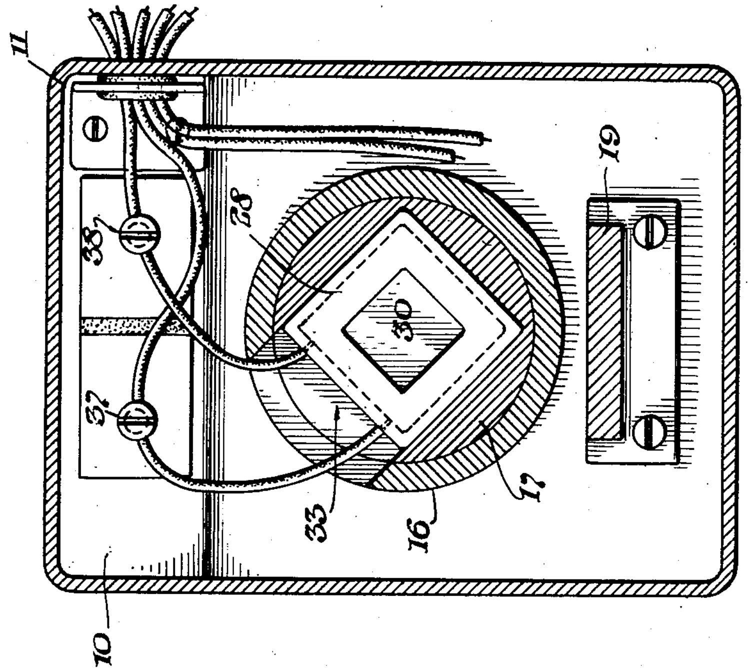
Figure 2 is a transverse vertical cross sectional view, the view being taken on the plane of the line 2—2 of Figure 1.
Figure 3:
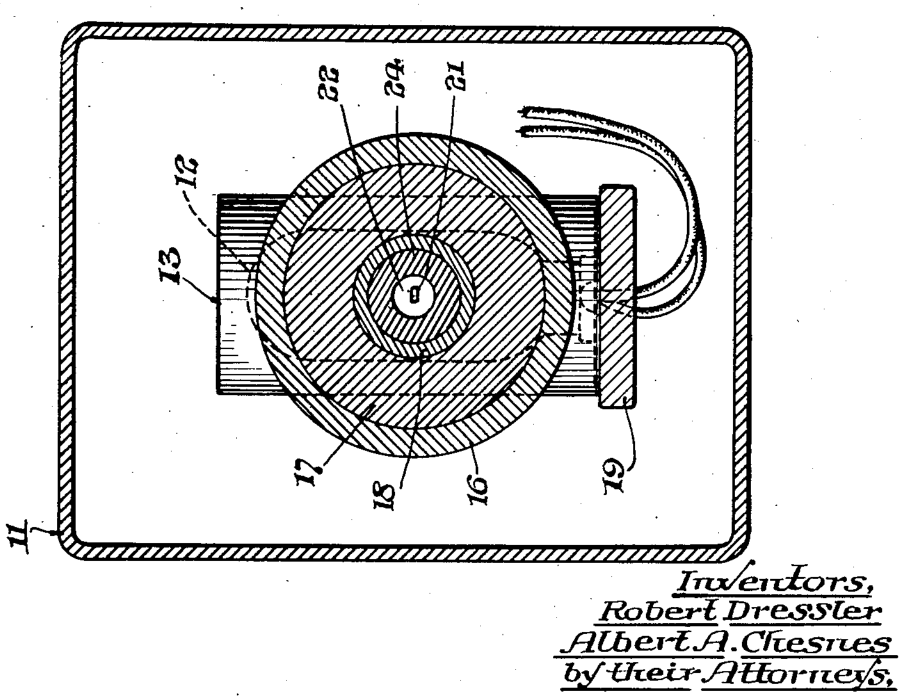
Figure 3 is a vertical transverse cross sectional view taken on the plane of the line 3—3 of Figure 1.

Light after passing through the optic 20 and the slit 21 then passes through a collimating achromatic lens 25 which lens is also supported within the sleeve 18 being held between the end flange 26 of the sleeve 18 and the end of interior sleeve 24. The light beam next enters a crystal structure comprising the crystal proper 27 together with the holder 28, the polarizer 30, quarter wave length biasing plate 31 and analyzer 32, see Figure 4. In a particular instance the crystal 27 is formed of dihydrogen phosphate and has a thickness of 0.045 inch and is resonant at approximately 40 kilocycles. The elements 27, 30, 31 and 32 are mounted in the holder 28 in the manner clearly indicated in Figure 1, these elements being supported in a slot 33 in the sleeve 17 as is seen particularly in Figure 2. The elements of the composite crystal structure just described are shown in Figure 4 in an enlarged exploded view. They form a laminated structure when mounted in the holder 28 and, if desired, may be adhered together by means of glyptal or a similar liquid adhesive.

Each side of the crystal 27 is provided with a transparent electrically conductive coating 34, Figure 4, which may be of electrically conducting glass or may be a molecular layer of metallic material such for example as silver. In contact with each of the conductive coatings mentioned, is a conductor 35 or 36, these conductors being connected to suitable terminals 37 and 38 which are in turn connected to the output of impedance matching transformer fed from a standard 500 ohm audio amplifier.

Mounted in a bore 40 in the face plate 10 is a focusing lens or optic 41 the barrel of which is screw-threadedly inserted in the bore 40 so that the lens may focus the image of slit 15 on a film 42 which film is within the usual movie camera. The face plate 10 is mounted on the movie camera with the lens mount 43 extending into the interior of the camera there being a proper light tight seal provided between lens mount 43 and the corresponding aperture in the movie camera.

The mounting 28 for the composite crystal structure described is, as has been explained previously, mounted in a slot 33 in the rigid sleeve 17. This slot 33 is carefully machined to assure that the crystal will be perpendicular to the axis of the light beam passing through the slit and through the crystal. Further, when the crystal structure comprising the elements 30, 31, 32 and 27 is assembled in the holder 28, shims are used if necessary between the elements 30 and 32 and the corresponding walls of the holder 28 to assure that the crystal 27 will not be tipped but will be exactly perpendicular to the axis. As will be obvious, this requires that the faces of the element just above recited be accurately cut to be exact planes and that the faces of the various elements be parallel to each other.

The slot 33 is additionally carefully machined in order to assure that the center of the crystal lies on the axis of the light beam.

It will be noted that the crystal is mounted in the slot 33 so that diagonals across the crystal lie on the horizontal and vertical lines. This is so that the slit image will be on a line, i. e., the horizontal line joining the two points of minimum light output, that is, two points of maximum light retardation. Such points of maximum light retardation are present in every crystal and are well known to those skilled in this art.

A small blower is mounted under the camera table in alignment with the chimney 13 which chimney is, as stated, provided in order to facilitate heat removal, since the crystal will not operate at high temperatures. As will be obvious, the air stream, in addition to reducing the temperature to that which can be sustained by the crystal, also reduces the temperature of and therefore lengthens the life of the lamp 12.

The foregoing has described one physical embodiment of our invention. However, the particular design of the housing and the cooperating parts is of relatively minor importance, the correlation between the properties of the crystal and the quarter wave filter as well as the length of the various portions of the light path being of primary importance.

There are two considerations which must be taken into account in modulators of the crystal type which do not enter into the design of mechanical modulators. The first of these considerations is the non-linear transfer characteristic of the crystal and the second is the distortion resulting from use of other than a point source of light, i. e. only a narrow angular field of light can be transmitted through the crystal without causing considerable distortion.

Both the transfer characteristic and the limitation of the angular field tend to produce distortion products in the sound track, the orders of magnitude of which are important considerations.

At zero angular field the distortion resulting from the non-linear transfer characteristic of the crystal is dependent on percentage modulation and for low percentage modulations distortion is negligible. However, as the modulation increases the distortion increases and at approximately 75% modulation the third harmonic distortion reaches a value of approximately 3%. The second harmonic distortion may, however, be kept to zero over the entire range, since the transfer function can be made symmetrical by proper choice of bias plate 31 which will cause all even harmonics to vanish.

When the distortion resulting from the departure from zero angular field is considered it will be seen that since standard 35 mm. motion picture sound track width is 0.1 inch the angular field through the crystal is finite and determined by the focal length of the slit pick-up optic 25. As the angular field increases with per cent modulation the second harmonic distortion increases parabolically while the third harmonic distortion remains substantially constant. Since it is desirable that the total distortion be not greater than 3%, the focal length of the optic 25 is made to equal the length of the largest dimension of the slit 21 (i. e. $\frac{1}{10}$ of an inch) divided by the angular field which can be tolerated, or expressed mathematically $$F=\frac{L}{\theta}$$

in which F is the focal length of the lens 25, L is the maximum dimension of the slit 21 and $\theta$ is the angular field expressed in radians. It should be noted at this point that the standard width of the slit 21 is one tenth inch (0.10") and that we have chosen a height of 0.0009" and that necessarily the slit shown at 21 is enlarged in the drawing.

The blue filter indicated at 15 is chosen so that the characteristics thereof combine with the spectral characteristics of the lamp, polarizer and the film to be utilized, to yield a maximum light sensitivity. Once the filter is chosen the wave length of the quarter wave plate can readily be established.

The use of the achromatic lens 25, together with the other factors heretofore set forth, provides a beam which, while not perfectly collimated, is acceptable for the purpose intended.

As has been stated hereinabove, the crystal structure comprising the polarizer, analyzer, quarter wave plate and crystal proper is what may be termed a laminated structure in that each element of the structure lies directly against the preceding element. In some instances it may be desirable that the laminated structure be produced by adhering of the parts one to another (with material such as Glyptal) although this is not essential and the mounting in the holder described above is a practial way of positioning the structural elements with respect to each other.

In the particular embodiment of the invention shown the capacity of the crystal structure is approximately 64 microfarads and has a substantially constant dissipation factor over the range from 500 cycles to 35 kilocycles. As has been stated hereinabove the crystals employed in modulators of this type which are presently in use are 0.045 inch in thickness and the frequency response of these crystals is substantially flat from about 5 cycles to their piezo resonance which occurs at approximately 40 kilocycles.

Since it is desirable to utilize a standard 500 ohm audio amplifier output a transformer is utilized to feed the crystal which will match this 500 ohm output and will produce a substantially flat response curve from 30 cycles to 10 kilocycles. The cutoff point of 10 kilocycles, although not the upper limit of frequency response possible from such a system, is ample and is better than can be procured from conventional light valves of the mechanical type. The transformer utilized is capable of delivering 2200 volts R. M. S. at audio frequencies into the crystal load. The total distortion for the entire system including the amplifier, transformer, and crystal is slightly over 5% at 75% modulation measured at 1000 cycles.

The light valve described is capable of operation over a wide range of frequencies extending from approximately 30 cycles to 10,000 cycles as stated above. However, the film produced with this modulator is intended to work with standard theatre projectors which are normally used with film that has had no special processing. Since the usual film processing tends to distort higher frequency components this light modulator is used in conjunction with a filter to limit the range of frequency on the film from 70 to 8500 cycles.

While we have described a preferred embodiment of our invention it will be understood that many modifications may be made without deviating from the principles thereof. Therefore we wish to be limited not by the foregoing description, but solely by the claims granted to us.

What is claimed is:

1. A light modulator for sound-film recorder comprising in combination a light source, a plate having a slit therein, means for focusing light from said source on said slit, a piezoelectric crystal, means for collimating a beam of light from said slit through said crystal, a polarizer in the path of light between said collimating means and said crystal, means for focusing a beam of light from said crystal upon a film, an analyzer interposed in the path of light between said crystal and said focusing means, and means for applying a sound modulator voltage to said crystal to rotate the plane of polarization to thereby vary the light transmitted to the film.

2. A light modulator as claimed in claim 1, characterized in that the collimating means is a lens having the focal length equal to $$\frac{L}{\theta}$$

where L is the maximum dimension of the slit and $\theta$ is the angle between rays of light entering said crystal.

3. A light modulator as claimed in claim 1, characterized in that said light source, said slit and said focusing means are arranged in a group, said collimating means, piezoelectric crystal, polarizer, and analyzer are arranged in a second group and said groups are spaced apart so that said collimating means is removed from said piezoelectric crystal a distance equal to $$\frac{L}{\theta}$$

wherein L is the maximum dimension of the slit and $\theta$ is the angle between rays of light entering said crystal.

4. A light modulator as claimed in claim 1 characterized in that an optical filter is interposed in the light path between said light source and said slit and further characterized in that a quarter wave length optical bias plate is interposed in the path of light between said collimating means and said polarizer, said bias plate serving to eliminate a second harmonic distortion.

5. A light modulator for sound-on-film recording comprising a housing, a lamp within said housing, a chimney surrounding said lamp, said chimney serving to remove heat generated by said lamp from said housing, an optical filter in said chimney, an enclosed light path within said housing having one open end adjacent said filter and the opposite end adjacent a film on which recording is to occur, a plate having a slit therein located in said light path, a lens interposed between said slit and said filter for focusing the light projected from said filter upon said slit, a light valve comprising a polarizing means, a crystal for rotating the plane of polarization of light through said polarizer, and an analyzing means; means for collimating the beam of light from said slit through said light valve, means for focusing the beam from said light valve upon the film, and means for impressing modulating voltages upon said crystal to thereby rotate the plane of polarization and vary the intensity of the beam falling upon the film in accordance with the impressed modulated voltage.

6. A device as claimed in claim 5 characterized in that said light valve also comprises a quarter wave length optical biasing plate interposed between said polarizing means and said crystal.

7. A light modulator as claimed in claim 5 characterized in that the focal length of said collimating means is determined in accordance with the equation $$F=\frac{L}{\theta}$$

in which F equals the focal length of the collimating means, L equals the maximum dimension of said slit and $\theta$ equals the angle subtended by the rays of light forming said beam as they fall upon said light valve.

8. A light modulator as claimed in claim 7, characterized in that said light source, said slit and said focusing means are arranged in a group, said collimating means, piezoelectric crystal, polarizer, and analyzer are arranged in a second group and said groups are spaced apart so that said collimating means is removed from said piezoelectric crystal a distance equal to $$\frac{L}{\theta}$$

wherein L is the maximum dimension of the slit and $\theta$ is the angle between rays of light entering said crystal.

9. A light modulator as claimed in claim 7 characterized in that said piezoelectric crystal is formed of dihydrogen phosphate.

10. A light modulator as claimed in claim 7 characterized in that said crystal is formed of dihydrogen phosphate, and has a thickness of 0.045 inch and said slit is rectangular, one side being approximately 0.1 inch and the other side 0.001 inch in length.

ROBERT DRESSLER.
ALBERT A. CHESNES.

References Cited in the file of this patent

UNITED STATES PATENTS

| Number | Name | Date |
|---|---|---|
| 1,789,521 | Feingold | Jan. 20, 1931 |
| 2,109,540 | Leishman | Mar. 1, 1938 |
| 2,328,478 | Mason | Aug. 31, 1943 |
| 2,350,892 | Hewson | June 6, 1944 |
| 2,493,200 | Land | Jan. 3, 1950 |